E. S. KINGSTON.

Assignor to G. A. REYNOLDS.

LAST FOR BOOTS OR SHOES.

No. 10,630. Reissued July 28, 1885.

WITNESSES

C. T. Bell

A. M. Tanner

INVENTOR,

E. S. Kingston,

By Paine & Sood,

Attorneys

UNITED STATES PATENT OFFICE.

EDWARD S. KINGSTON, OF LITTLE FALLS, ASSIGNOR TO GEORGE A. REYNOLDS, OF UTICA, NEW YORK.

LAST FOR BOOTS OR SHOES.

SPECIFICATION forming part of Reissued Letters Patent No. 10,630, dated July 28, 1885.

Original No. 273,108, dated February 27, 1883. Application for reissue filed May 8, 1883.

*To all whom it may concern:*

Be it known that I, EDWARD S. KINGSTON, of Little Falls, in the county of Herkimer and State of New York, have invented a new and Improved Last for Boots or Shoes, of which the following is a full, clear, and exact description.

The object of my invention is to furnish a last of iron of a form that can be readily manufactured, and which in use can readily be contracted for removal from the boot as a whole instead of in sections. To accomplish these results I propose to produce a last which can be cast in molds formed direct from the patterns, and to fashion the parts of the last so that they can be thus used for repeated casting; and in order that it can be readily contracted for removal from a boot as a whole instead of in sections, and yet be serviceable as a last when in its normal position, I propose to make the last conform in its configuration and in the curvature of its surface to an ordinary last, and by constructing the upper and lower parts so that they can close in toward each other cause it to be collapsible.

My invention consists in a hollow last of iron having its upper section fitted for adjustment.

It further consists in certain features of construction as hereinafter described and claimed.

Reference is to be had to the accompanying drawings, forming a part of this specification, in which similar letters of reference indicate corresponding parts in all the figures.

Figure 1:
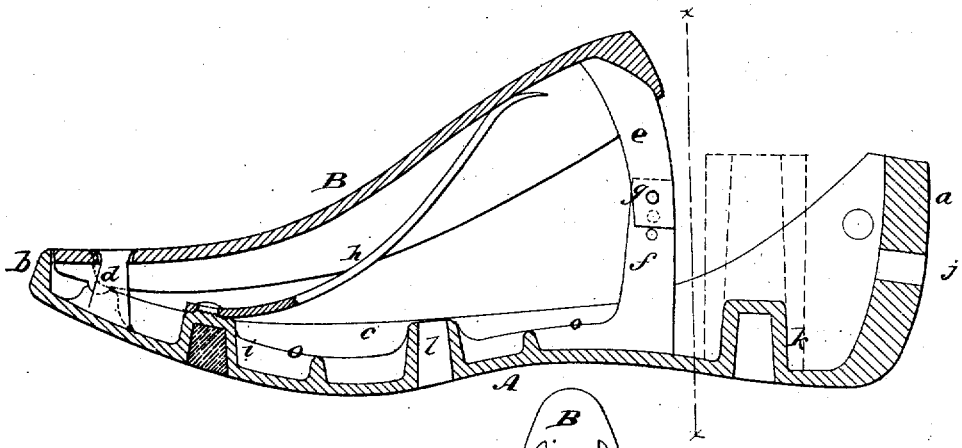
Figure 2:
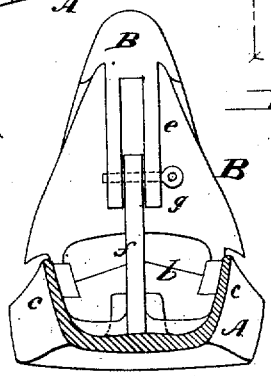

Figure 1 is a longitudinal section of a last of my improved construction. Fig. 2 is a cross-section of the same on the line *x x*, Fig. 1.

A is the main or bottom portion of the last, formed with a heel, *a*, and toe, *b*. Between the toe and heel the body is hollowed out, and is formed with raised side rims, *c c*.

B is the block or top portion of the last, connected at its forward end to the main body A by a post, *d*, which is fixed upon the bottom and loosely connected to the block B. At its rear end the block B is formed with a slotted flange, *e*, which sets over a post, *f*, on the bottom A. Both the post *f* and flange *e* are formed with holes for receiving a cross-piece, *g*, by which the block B is held in a more or less elevated position, according to the form it is desired to give to the instep of the boot.

*h* is a spring, fast at one end to the bottom A, and bearing at its other end upon the under side of the block B, so as to press the block upward.

*i* is a cavity or socket formed on the bottom A, and open at the under side of the last for receiving a filling of cork.

*k* is a similar cavity or socket near the heel of the last, which also serves to receive a filling of cork, and *l* is a cavity or socket at the mid-length of the last.

The bottom A is formed with a rib, *o*, extending longitudinally, for stiffening the casting, and the block B may also have a similar rib upon its under side.

The rim *c* serves as a guide for the upper leather from the instep to the sole. The sole of the boot or shoe is to be attached to the sole of the last by means of nails or pegs driven into the cork filling of the hollow projections *i k l*.

By the adjustment of the top or block B the desired fullness may be given to the boot or shoe, and in this movement of the block it works upon the toe-post *d* as a center, and if desired the block may be hinged at the toe instead of being connected with the post in the manner shown. It will be seen that when the block B falls it closes down toward the bottom section, and in doing so, as the upper part of the last is less in its lateral dimensions than the lower part, (for the sides of the last being left open the edge of the upper section necessarily comes at a narrower part of the foot than the edge of the lower part,) it falls within the contour of the last; hence, when the locking device is released for the purpose of removing the last from a shoe the upper part falls away from the upper leather without any resistance.

The spring *h* is used in the operation of what is called "second lasting" on trimmers' or finishers' lasts, and it acts to prevent the instep leather from falling down in the way of the workman's knife while trimming. In this work the top block, B, may, if desired, be dispensed with, and the spring will act in the same manner for raising the leather of the instep.

It will be seen that the last is made in two sections, which may be readily cast, and each will form its own core in the mold, thereby dispensing with the necessity of making a separate core for each last cast. This arises from the construction and shape of the two sections, as is apparent from the drawings, whereby the parts are specially adapted to be so cast, there being no undercut spaces, and the inclination of the surfces and of the projections of both parts being such as to admit of their being so used.

In removing the last from the boot, the locking-pin having been withdrawn, it will commence to contract as soon as the pulling begins, and the upper part held up by the spring will close down toward the bottom part until it will allow the last to be removed.

Figure 3:
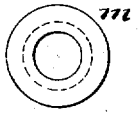

To facilitate the removal I use a hollow tube, (shown at *m* in Fig. 3,) which is to be applied, as shown in dotted lines in Fig. 1, to the projection *k*, and the last is then placed upon a shoe-maker's jack, and can be pulled out in the usual manner.

The last is cast in malleable iron, which is afterward tinned to give to it a smooth surface that will not rust.

I am aware that an instep-stretcher has been heretofore used consisting of hollowed upper and lower sections hinged at the toe, and provided with means for raising the upper section to stretch the instep of a boot or shoe; but it will be observed that there are essential points of difference between my last and such an instep-stretcher—for example, the upper and lower parts of the latter are the same in their lateral dimensions and their edges shut together when in its normal position, and also that it is not adapted to be cast direct from the section of the stretcher without the use of separate cores.

Having thus described my invention, I claim as new and desire to secure by Letters Patent—

1. The collapsible shell-last formed of a bottom section and a broad adjustable instep section adapted to fall within the contour of the last, whereby the last may be removed from a boot or shoe, substantially as described.

2. The collapsible shell-last consisting of a bottom section formed with a toe, and with a broad instep section extending from the toe to the top of the instep and hinged to the bottom section behind the toe, substantially as shown and described.

3. The collapsible shell-last formed of a bottom section, A, having heel *a*, toe *b*, and side rims, *c c*, and a broad upper section, B, hinged to the bottom at the toe, with suitable devices for holding the upper section in a raised position, substantially as shown and described.

4. The collapsible shell-last formed of a bottom and a broad pivoted upper section, which leaves open sides to the last when the upper section is in its normal position, the upper section extending only to the top of the instep, with suitable devices for holding the upper section in its raised position, substantially as shown and described.

5. In a hollow last, the combination of the bottom section, A, with the spring *h*, substantially as and for the purpose set forth.

6. A hollow last formed of the bottom section, A, and adjustable section B, in combination with the spring *h*, substantially as shown and described.

7. The collapsible last having a hinged instep-block adapted to fall within the contour of the last, whereby the last may be removed from the boot or shoe without detaching the instep-block from the last, substantially as shown and described.

8. The upper section, B, formed with the flange *e*, and combined with the main body A of the last, formed with the parts *d f* and a locking device, substantially as and for the purpose set forth.

9. In combination with a last having a projection, *k*, the hollow tube *m*, substantially as and for the purpose set forth.

EDWARD S. KINGSTON.

Witnesses:

GEO. A. REYNOLDS,

L. B. BRACE.